(12) United States Patent
Kiradjiev et al.

(10) Patent No.: US 9,116,777 B1
(45) Date of Patent: Aug. 25, 2015

(54) IN-FLIGHT PROCESS INSTANCE MIGRATION BETWEEN BUSINESS PROCESS EXECUTION LANGUAGE (BPEL) SUITES

(71) Applicant: International Business Machines Corporation, Armonk, NY (US)

(72) Inventors: Plamen Kiradjiev, Mainz (DE); Dieter Koenig, Herrenberg (DE); Michael Lackerbauer, Unterhaching (DE); Michael Redert, Holzkirchen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/495,922

(22) Filed: Sep. 25, 2014

(51) Int. Cl.
*G06F 9/44* (2006.01)
*G06F 9/445* (2006.01)

(52) U.S. Cl.
CPC .................................... *G06F 8/65* (2013.01)

(58) Field of Classification Search
None
See application file for complete search history.

(56) References Cited

U.S. PATENT DOCUMENTS

| | | | | |
|---|---|---|---|---|
| 5,150,469 | A * | 9/1992 | Jouppi | 712/244 |
| 5,694,601 | A * | 12/1997 | White | 718/101 |
| 7,814,470 | B2 * | 10/2010 | Mamou et al. | 717/162 |
| 2003/0009754 | A1 * | 1/2003 | Rowley et al. | 717/177 |
| 2003/0051236 | A1 * | 3/2003 | Pace et al. | 717/177 |
| 2005/0010804 | A1 * | 1/2005 | Bruening et al. | 713/200 |
| 2008/0196027 | A1 * | 8/2008 | Hohmann et al. | 718/100 |
| 2009/0158268 | A1 * | 6/2009 | Pichetti et al. | 717/170 |
| 2009/0276771 | A1 * | 11/2009 | Nickolov et al. | 717/177 |
| 2012/0192189 | A1 | 7/2012 | Diament et al. | |
| 2013/0125128 | A1 | 5/2013 | Hohmann | |

* cited by examiner

*Primary Examiner* — Chameli Das
(74) *Attorney, Agent, or Firm* — Arnold Bangali; Rahan Uddin

(57) ABSTRACT

A method for performing process instance migration between a source workflow environment and a target workflow environment is provided. The method includes a server computing system, exporting a source workflow environment to a target workflow environment. The method further includes the server computing system, migrating process instances from the source workflow environment to the target workflow environment. The method further includes, if a jump function of the target workflow environment is restricted to an activity sequence, a target computing system of the target workflow environment, adjusting the exported process models. The method further includes the target computing system, initializing another process instance, from the exported process models in the target workflow environment.

20 Claims, 6 Drawing Sheets

IN-FLIGHT PROCESS INSTANCE MIGRATION BETWEEN BUSINESS PROCESS EXECUTION LANGUAGE (BPEL) SUITES

BACKGROUND

The present invention generally relates to computer systems, and more particularly to In-flight process instance migration between business Process Execution Language (BPEL) suites and Business Process Model and Notation suites. Business process management (BPM) is a management discipline that focuses on improving business performance by managing, and optimizing a company's business processes. It can therefore be described as a process optimization process. Also, BPM is adaptive to enable organizations to be efficient, effective and capable of change than a functionally focused, traditional hierarchical management approaches. For instance, these processes can impact the cost and revenue generation of an organization. Also, process migration of BPM is the ability to migrate a long running process instance to a different version of process template, of the BPM, from which it was generated, in the BPM.

SUMMARY

According to one embodiment, a computer-implemented method for performing process instance migration between a source workflow environment and a target workflow environment is provided. The computer-implemented method includes a server computing system, exporting, via a source engine, by one or more processors, process models of a source workflow environment to a target workflow environment, whereby the source workflow environment is a source business process management environment, of a service-oriented architecture suite for building, deploying, and managing service oriented architectures with the business process management environment, and whereby the target workflow environment provides run time processing for process design, execution, monitoring and optimization of a business workflow environment, and wherein, the run time processing provides system integration support between the source workflow environment and the target workflow environment.

The computer-implemented method further includes the server computing system, migrating, via the source engine, by the one or more processors, process instances from the source workflow environment to the target workflow environment. The computer-implemented method further includes if a jump function of the target workflow environment is restricted to an activity sequence, a target computing system of the target workflow environment, adjusting, via a target source engine, by one or more processors, the exported process models, whereby adjustment of the exported process models includes inclusion of wait activities of the target workflow environment, at the beginning of a branch of activities, whereby, if the jump function allows arbitrary positioning of the exported process instances, the computer-implemented further includes: initializing, by the one or more processors, yet another process instance from the exported process models in the target workflow environment. The computer-implemented method further includes the target computing system, initializing, via the target source engine, by the one or more processors, another process instance, from the exported process models in the target workflow environment.

The computer-implemented method further includes the target computing system, setting, via the target source engine, by the one or more processors, instance variables of the target workflow environment, whereby the instance variables are set from source instance data of the source workflow environment. The computer-implemented method further includes the target computing system, applying, via the target source engine, by one or more processors, jumps to an end sequence of the branch of activities, until a position of the exported process instance is reached in the source workflow environment, whereby the branch of activities includes at least one of a scope, switch, or parallel activity of the target workflow environment. The computer implemented method further includes initializing, via the target engine, by the one or more processors, process instance in the target workflow environment, wherein the process instance includes the same process state and the same process data of the source workflow environment. The computer implemented method further includes compiling, via the source engine, by the one or more processors, data of the migrated process instance in the source workflow environment. The computer implemented method further includes transmitting, via the source engine, by the one or more processors, the compiled data of the migrated process instance, from the source workflow environment to the target workflow environment. The computer implemented method further includes setting, via the target engine, by the one or more processors, an equivalent process state of data of the migrated process instance of the source workflow environment in the target workflow environment.

According to another embodiment, one or more processors, one or more computer-readable memories, one or more computer-readable tangible storage devices and program instructions which are stored on at least one of the one or more storage devices for execution by at least one of the one or more processors via at least one of the one or more memories. The computer system includes program instructions to export, via a source engine process models of a source workflow environment to a target workflow environment. The computer system further includes program instructions to migrating, via the source engine process instances from the source workflow environment to the target workflow environment. The computer system further includes program instructions to adjust, via a target source engine, by one or more processors, the exported process models, whereby adjustment of the exported process models includes inclusion of wait activities of the target workflow environment, at the beginning of a branch of activities, if a jump function of the target workflow environment is restricted to an activity sequence, a target computing system of the target workflow environment.

The computer system further includes program instructions to initialize, via the target source engine another process instance, from the exported process models in the target workflow environment. The computer system further includes program instructions to set via the target source engine instance variables of the target workflow environment, whereby the instance variables are set from source instance data of the source workflow environment. The computer system further includes program instructions to apply via the target source engine jumps to an end sequence of the branch of activities, until a position of the exported process instance is reached in the source workflow environment.

A preferred embodiment of the present invention includes a method, a computer system and a computer program product for automatic in flight process instance migration from a source to target workflow environment of a process execution workflow environment, including, for instance, a jump functionality that allows positioning of an execution pointer to particular model activity for a process instance of the process execution workflow environment. According to at least one preferred embodiment, the method includes exporting process model from the source environment into the target workflow environment, including exportation of environment specific adjustments, such as, vendor specific extension. The method further includes exporting process instances state and data of the source workflow environment in a temporary storage. The method further includes loading source process instance state and data from said temporary storage. If the jump function is restricted to an activity sequence only, the method includes: adjusting process model of the target workflow by wait activities at the beginning of each branch of complex activities, whereby a complex activity includes at least switch, initializing new instance from the model in the target workflow environment; and applying a sequence of jumps to the end of the current branch and triggering the instance to appropriate branches of following complex activity till state of the source instance is reached, whereby instance variables are set to the source instance data values. The method further includes starting process instance in the target workflow environment and continuing herewith from the same state and with the same data as the data of the source workflow system. For example, if the jump function allows arbitrary positioning of the state pointer and data, the method further includes initializing new instance from the model in the target workflow environment; and setting data and execution pointer to the desired position of the state pointer.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
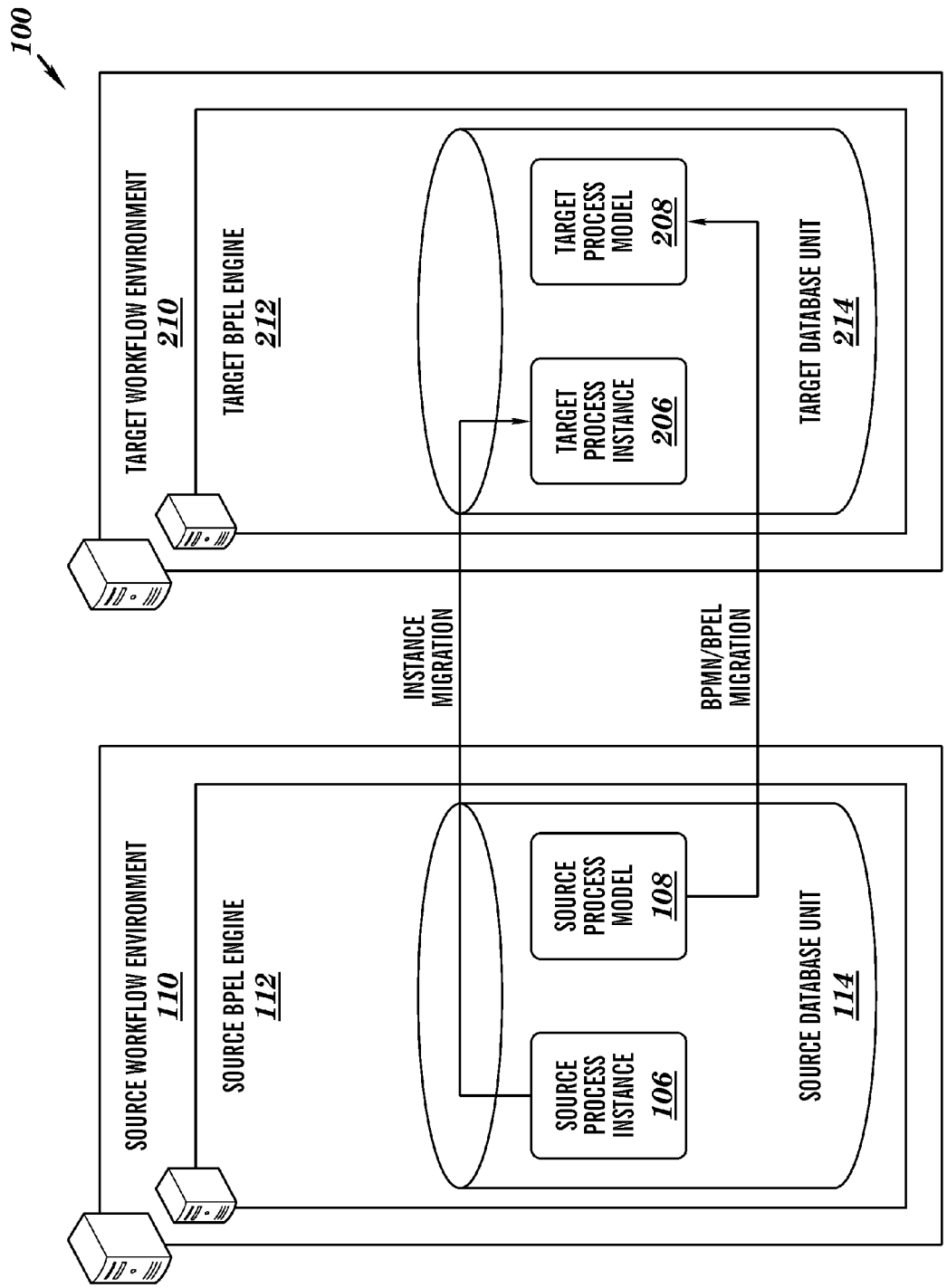
FIG. 1 illustrates a networked computer environment according to one embodiment.

Embodiments of the present invention comprise one or more circuits or subassemblies of circuits, as well as methods of operation that are executed to perform in-flight instance migration of process instance, from a source workflow environment to a target workflow environment. At least one embodiment of the present invention focuses especially on a case of overcoming restrictions of jump-and-set functionality for real-world processes modeled in structured workflow environments, including, for example, the target workflow environment.

Also, the migration from the source workflow environment to the target workflow environment further includes examination of the jump-and-set functionality of the target workflow environment. The jump functionality of the target workflow environment is examined to allow positioning of an execution pointer of the in-flight migration to process model activities of the target workflow environment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof.

A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like, conventional procedural programming languages such as the "C" programming language, a hardware description language such as VERILOG, or similar programming languages. The program code may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described below with reference to flowchart illustrations and/ or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention will now be described in detail with reference to the accompanying Figures. Referring now to FIG. 1, process execution workflow environment 100, for in-flight migration of process instance, from a source workflow environment to a target workflow environment. The in-flight migration of the process instance, can include, take over of the running instances of process models from source workflow environment to target workflow environment, as described below, in accordance with embodiments of the present invention.

According to at least one embodiment of the present invention, in-flight instance migration can also include a business Process Model and Notation (BPMN)/Business Process Execution Language (BPEL) migration of the process models of the source workflow environment to target process model of the target workflow environment. In-flight instance migration of running instances of process models from source workflow environment to target workflow environment, of workflow environment 100, thus, overcomes restrictions of jump-and-set functionality for real-world processes modeled in structured workflow environments.

For example, according to at least one embodiment, process execution workflow environment provides analyzes of operations of a process instance of the source workflow environment, and whereby, the operated process instance is utilized for re-instantiation, at a current point of execution in the target workflow environment. In the depicted embodiment, process execution workflow environment 100 includes source workflow environment 110 and target workflow environment 210.

Source workflow environment 110 is a source business process management (BPM) environment, including, for example, a Service-Oriented-Architectures (SOA) suite for building, deploying, and managing Service-Oriented Architectures with the BPM environment. The BPM environment is a systematic approach for providing efficient management of workflow of business goals, or activities of a business or organization. Also, business processes of business process instance of SOA are sets of business related activities that are invoked to achieve business goals, or activities of SOA within source workflow environment 110. Source workflow environment 110 can also be a BPM server system, such as a management server, a web server, or any other electronic device, or central computing server system that is capable of performing in-flight instance migration from source workflow environment 110 to target workflow environment 210, and specifically, for overcoming restrictions of jump-and-set functionality for real-world processes modeled in structured workflow environments of process execution workflow environment 100.

Source workflow environment 110 can also represent a "cloud" of computers interconnected by one or more networks, whereby source workflow environment 110 is a primary server for a computing system utilizing clustered computers when accessed through process execution workflow environment 100. Source workflow environment includes source business process execution Language (BPEL) engine. 112. Source BPEL engine 112 is an executable operating systems language that specifies system actions within business processes with web services of source workflow.

Source BPEL engine 112 executes program instructions for overcoming restrictions of jump-and-set functionality for real-world processes modeled in structured workflow environments of process execution workflow environment 100. Source BPEL engine 112 is further adapted to navigate and jump to the appropriate position in the BPEL process of target workflow environment, by handling all possible BPEL constructs, like scopes, joins, switch, loop, subprocess, of target workflow environment 210.

Source BPEL engine 112 further creates, deploys, and manages BPEL business processes, including, for example, source process instances and sources process modules of source BPEL engine 112. Source database unit can be any type of storage device, storage server, storage area network, redundant array of independent discs (RAID), cloud storage device, or any type of data storage for maintaining a record of source BPEL process manager, including, business process instance, or business process executions of BPEL constructs, like scopes, joins, switch, loop, subprocess of BPEL engine, for performing in-flight instance migration from source workflow environment 110 to target workflow environment 210, in accordance with the present invention.

Source BPEL includes source database unit 114. Source database unit 114 can be any type of storage device, storage server, storage area network, redundant array of independent discs (RAID), cloud storage service, or any type of data storage that store information pertaining to source process instance and source process model of source BPEL 112, within source workflow environment 110. Source database unit 114 includes, for instance, one or more process models, and one or more process instances. For example, in the depicted environment, source database unit 114 includes source process instance 106 and source process model 108. Source BPEL engine 112 also creates, executes, and manages process instance within source workflow environment 110, including, for example, source process instance 106.

Source process instance 106 is an instantiation of a process template of the business processes of source workflow environment 100. For instance, business processes of source process instance 106, which can be defined in Business Process Execution Language BPEL), represents stateful Web services, and as such, they can have long running interactions with other Web services. Source process instance 106 is also a runtime instantiation of a process model of source BPEL engine 112. Also, an instance of the runtime instantiation of source process instance 106 completes when its last activity completes, a terminate activity runs, or a fault occurs that is not handled by the process. Source process model 108, is, for instance, a declarative business process model which specifies activities and flows of a business process within source workflow environment 110, in accordance with embodiments of the present invention.

Workflow environment 100 includes an instantiation tool, which navigates in-flight instance migration of source process model 108 to target process model 208, as depicted. For instance, the instance migration of the source process model 108 to the target process model 208 can be performed based on process model adjustment of target process model 208. The model adjustment can include adjusting process models of source process model 108 by adding stop markers, or wait activities, during the instance migration from source process model 108 to target process model 208. For example, the instantiation process of the instantiation tool can be navigation, and jump to a current execution pointer of source process instance 106 to target process instance 206 of target source environment 210, according to the information from the source workflow environment 110. For example, the instantiation process of the instantiation tool allows arbitrary process instance selection, migration, and further execution of source process workflow environment 110.

Target workflow environment 210 is a target business process management (BPM) environment, which provides tooling and run time for process design, execution, monitoring and optimization, along with basic system integration support of workflow environment 100. Target workflow environment 210 provides instant collaboration and real-time visibility through analytics to reinvent business processes of workflow environment 100, seamless integration of business processes with systems of engagement and systems of target workflow environment 210, or continuous insights into business operations of source workflow environment 110 and target workflow environment 210.

Target workflow environment 210 can also be a BPM mainframe server system, such as a management server, a web server, or any other electronic device, or central computing server system that is capable of receiving and processing in-flight instance migration of running instances of a particular process models from source workflow environment 110 to target workflow environment 210. Target workflow environment 110 can also represent a "cloud" of computers interconnected by one or more networks, whereby target workflow environment 110 is a primary server for a computing system utilizing clustered computers when accessed through workflow environment 100. Target workflow environment 210 includes target business process execution Language (BPEL) engine 212. Target BPEL 212 is an executable operating systems language, including, for example, extensible markup language (XML) that specifies system actions within business processes with web services of target workflow environment 210.

Target BPEL engine 212 is also adaptable to create, deploy, and manage BPEL business processes of workflow environment 110, including, for example, target process instances and targets process modules of target BPEL engine 212, in accordance with embodiments of the present invention. Target database unit 214 can be any type of storage device, storage server, storage area network, redundant array of independent discs (RAID), cloud storage device, or any type of data storage for maintaining a record of target BPEL process manager, including, business process instance, or business process executions of BPEL constructs, like scopes, joins, switch, loop, subprocess of BPEL engine, for performing in-flight instance migration from source workflow environment 110 to target workflow environment 210.

Target database unit 214 includes, for instances, one or more process models, and one or more process instances. In the depicted environment, target database unit includes target process instance and target process model. Target BPEL engine 212 also creates, executes, and manages process instance within target workflow environment 110, including, for example, target process instance. Target process instance 206 is an instantiation of a process template of the business processes of target workflow environment 210.

Business processes of target process instance 206, which can be defined in BPEL, represent stateful Web services, and as such, they can have long running interactions with other Web services, in accordance with embodiments of the present invention. Target process instance 206 is also a runtime instantiation of a process model of target BPEL engine 212. Also, an instance of the runtime instantiation of target process instance 206 completes when its last activity completes, a terminate activity runs, or a fault occurs that is not handled by the process. Target process model 208, is, for instance, a declarative business process model which specifies activities and flows of a business process within target workflow environment 110.

The instance migration, between source process instance 106 and target process instance 206, from source process model 108 to target process model 208, includes metadata of source workflow environment 110, including, for example, process name, or process version of source workflow environment 110, value of all variables of the source process instances of source workflow environment 110, execution pointers of source process instances, and migration of BPEL model from source workflow environment 110 to target workflow environment 210, which is a pre-condition for instance migration. For instance, export of process models of source workflow environment 100 to target workflow environment 210 is performed between source process instance and target process instance, whereby all relevant process models are migrated and instrumental before operations of instance migration from the source workflow environment 100 to target workflow environment 210. The cascade of the process instances can be exported by using the APIs for exporting the position and variables data for a process instance of the source workflow environment 110, and all others started by it from source workflow environment.

The process model of the source process model 108, which is transferred to the target process model 208, includes an adjustment with the stop markers is needed to allow initiating of a process instance in the new environment and the ability to control instances by stopping them, setting the current scope variable data followed by a jump either to the current execution pointer or to the end of the sequence respectively scope. In-flight-migration of source process instance to the target process model 208 include, adjustment of process attributes between source process model and target process model, instrumental of BPEL constructs of source workflow environment 110 and target workflow environment 210, including, for instance, sequences, scope, flow, switch/case, loops, which thus allows conditional navigation and jump of process models from source workflow environment 110 to target workflow environment 210, depending on the variable data and current branch in a generic sense, done by extending the conditions by the navigation-related global variable of the migration of process models from source process model to target process model.

As described, the particular instantiation of the in-flight instances between source workflow environment 110 and target workflow environment 210 is performed by a process instantiation tool that navigates through the instrumented target process model 108, and sets the execution pointer of target process instance and the variable data based on the information from the source process instance. Also, different BPEL constructs, during migration of process instances from source workflow environment 110 and target workflow environment 210, includes, scope, sequence, parallel flow, loop constructs, as well as the depending subprocess instances of target workflow environment and source workflow environment are handled recursively. The result is a process instance tree is created in the new environment of target workflow environment 210, with the same variable data and at the same position as source workflow environment 110, in accordance with embodiments of the present invention.

Figure 2A:
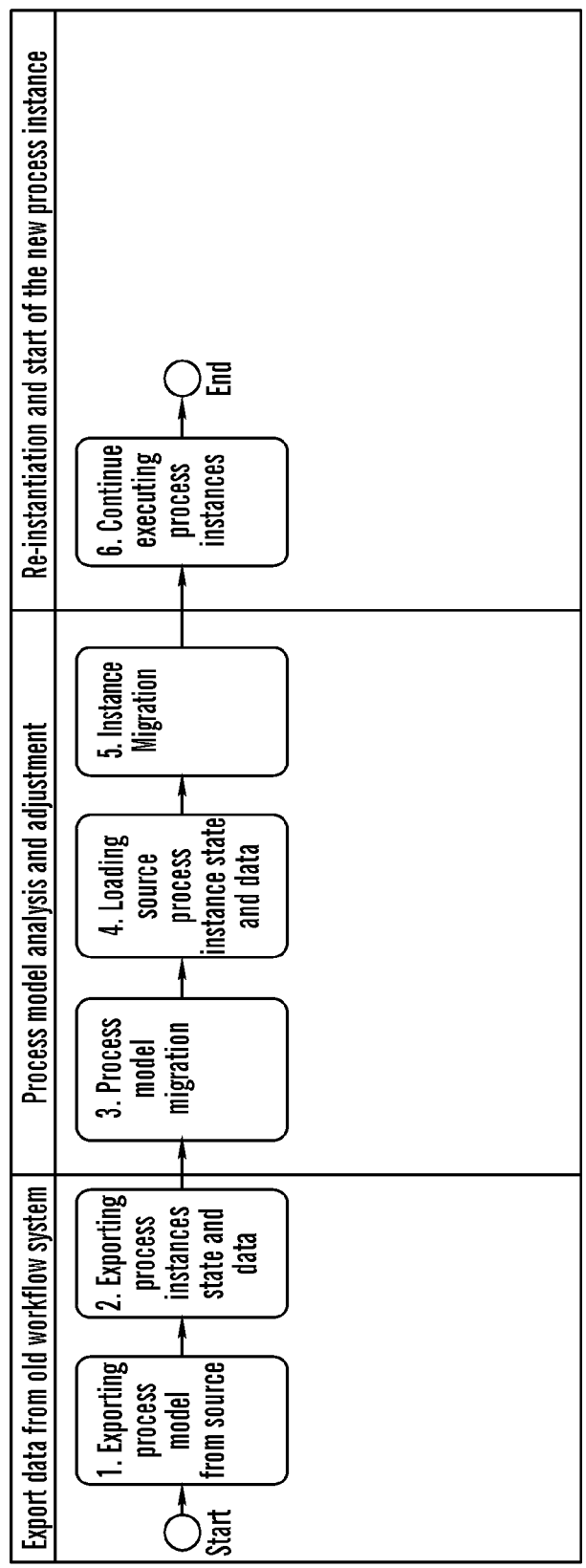
FIGS. 2A-2D illustrates the components and algorithms associated with process execution workflow environment, for in-flight migration of process instance, according to at least one embodiment.

FIG. 2A is a flow diagram depicting steps for export data, including, process models and process instance state and data from source workflow environment 110 to target workflow environment 210. Source BPEL engine 112 exports data from source workflow environment 110 to target workflow environment 210. For instance, source BPEL engine 112 exports source process model 108 from source workflow environment 110 into target workflow environment 210. (Step 1). For instance, the transmitted process models include, for example, BPEL source together with related artifacts of source workflow environment 110 including, web services description language (WSDL) and extended development system (XDS).

Source BPEL engine 112 further exports process instances state and data of source process instance 106 from source workflow environment 110 to target workflow environment 210. (Step 2). For example, the export is controlled by the instance migration tool which uses the API of the source BPEL engine to read all the data. Instance migration tool writes the data to a (XML) file. Information about the current state and variable data of source workflow environment 110 is extracted in source workflow environment 110 in a document format, such as, XML document format, based on old workflow system application programming interface (APIs). At least one or more XML files include source instance data for all (sub-) process instances started from a particular root instance.

Also, the following information is included in the XML output for each instance of the source instance data: process instance meta-data, e.g. process instance identification, name, and state; current activity information, which is where the particular process instance is stopped (in a receive activity), and waiting for a response from another instance or a service, with the information about name, identification, creation date, service name, operation name, correlation id, etc.; all variable data at the time when current activity is waiting for getting back the control; and start message for the particular instance including the data the instance is started with.

Target workflow environment 210 imports the exported data, from source workflow environment. Target workflow environment imports BPEL process model from source workflow environment. For example, although the process models are based on the BPEL standard, product specific adjustments have to be performed on the models. It is more like a migration than a simple export and import. For instance, BPEL process model with all related artifacts is imported into the new workflow system, in accordance with embodiments of the present invention. (Step 3). Also, target workflow environment 210 further processed by an instance migration tool of the target workflow environment 210. Also, target workflow environment 210 further loads source process instance state and data. The loaded source process instance includes XML instance data from the source workflow system, which is made available to the migration procedure of the process instance from target workflow environment 210. (Step 4). For example, target workflow environment 210 performs analysis and adjustment of the exported process instance.

Instrument BPEL is the first main phase of process instance migration algorithm, whereby, the original imported BPEL process is enhanced by wait activities at the beginning of each sequence respectively scope in order to prepare for the real migration process, traversing down the process model scopes. For instance, as the jump operation is restricted only within a single sequence, putting a wait at the beginning of each sequence, enables the application of a series of trigger to the beginning, and jump to the end of each sequence respectively scope of the exported process instance, down to the current stopped place.

Target workflow environment 210 further performs re-installation, and start of the new process instance, which is exported from source workflow environment 110. For instance, target workflow environment 210 recursively migrates process instance and sub-processes started by it to find the current execution pointers in each started process instance. (Step 5). Target workflow environment 210 also continues normal execution of process instance in target workflow environment 210 from an execution pointer of source workflow environment 110, by ignoring the inserted wait activities. (Step 6).

Figure 2B:
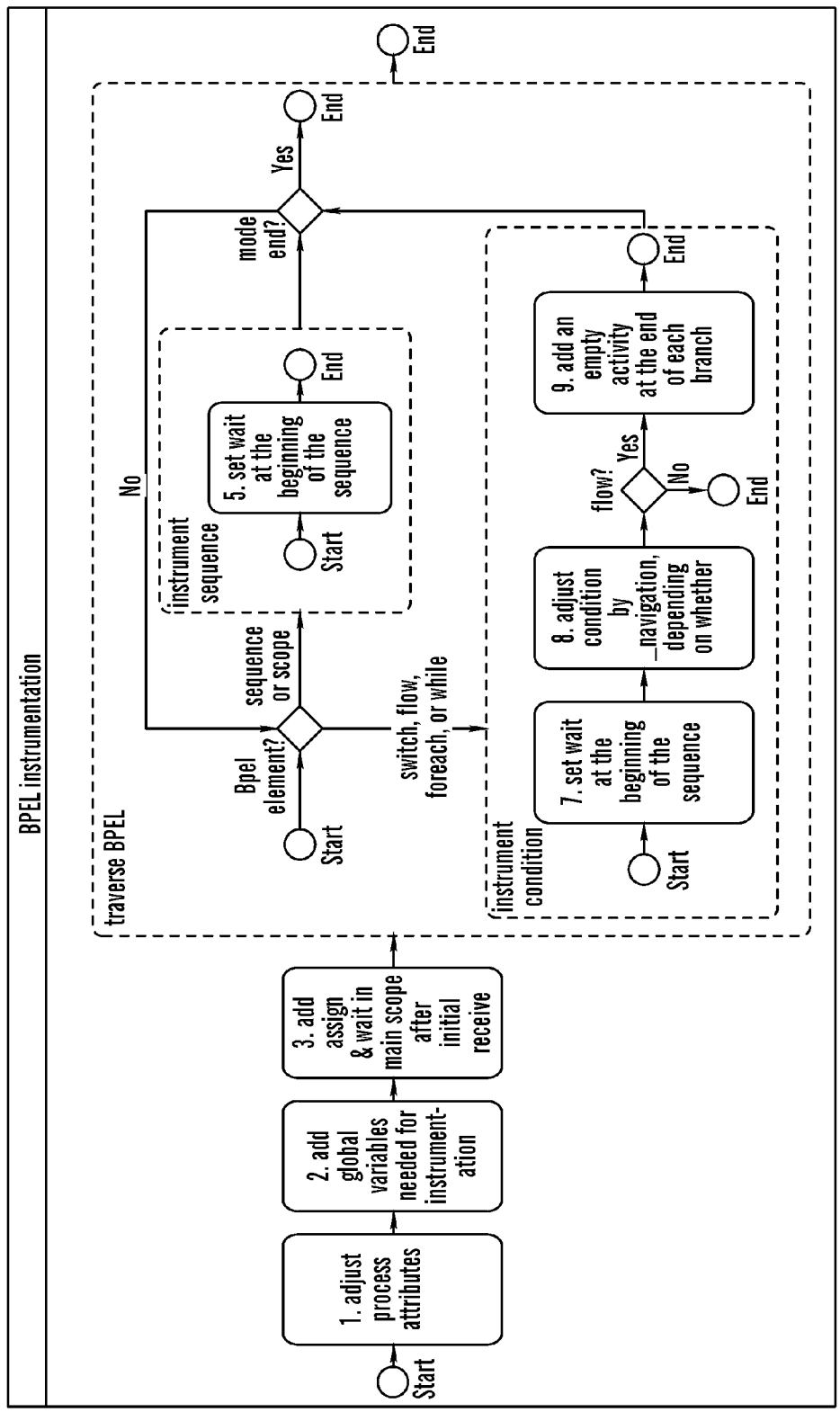

FIG. 2B illustrates a functional block diagram for performing a first phase of instance migration, instrument BPEL, when BPEL code is extended by wait activities at the beginning of each scope of migrated process instance by source workflow environment. According to at least one embodiment, target workflow environment 210 sets some process model parameters of source process model 106 that are important for migration to target process model 206 (Step 1). The model parameters can include, for example, "autoDelete" to "no", in order to keep the execution log after the end of the instance for debugging, respectively cleaning the valid from parameter in order set the validity of the instance to the deployment time of the process instance.

According to an embodiment of the present invention, target workflow environment 110 further adds global variables needed for instrumentation of the BPEL. (Step 2). Further, the added variables include two global variables, which include, for instance, initial wait with a leading assign activity are added at the beginning of the process model, the assign sets _initMode to true. Also, the wait is where the instance has to stop during migration immediately after its initialization. (Step 3). The added variables can also include a navigation variable. The navigation variable can be used to modify the conditions in the conditional activities in order to set the correct branch where the instance has stopped, depending on the instance data from the old workflow system. For parallel activities (foreach in BPEL), the navigation variable is used to set the number of parallel streams.

Next, BPEL traverses. For example, at decision 4, target workflow environment 210 determines the BPEL element. For example, depending on whether the following activity is a conditional activity, including, for example, switch, while, foreach, etc., the condition is modified by the navigation variable, or not, in both cases a wait is added at the beginning of each scope respectively branch. Thereafter, in at least one embodiment, instrumental sequence is performed by target workflow environment 210, for instance, at step 5, target workflow environment 210 sets wait at the beginning of the sequence. Also, at decision 6, target workflow environment 210 determines whether the model has ended, if the model has ended, then the sequence ends. Target workflow environment 210 further performs instrument condition.

For instance, at step 7, target workflow environment 210 sets wait at the beginning of the sequence. Further, target workflow environment 210 adjusts condition by navigation for pointer in scope. (Step 8). As depicted, for each condition, a modification is added by an "or" term for the navigation, which is true for the branch where the instance has stopped, otherwise false. Further, the target workflow environment 210 determines, whether the next BPEL construct is a flow? If it is not a flow the sequence ends. However, in the case of a flow, then, at step 9, target workflow environment 210, add an empty activity at the end of each branch.

Figure 2C:
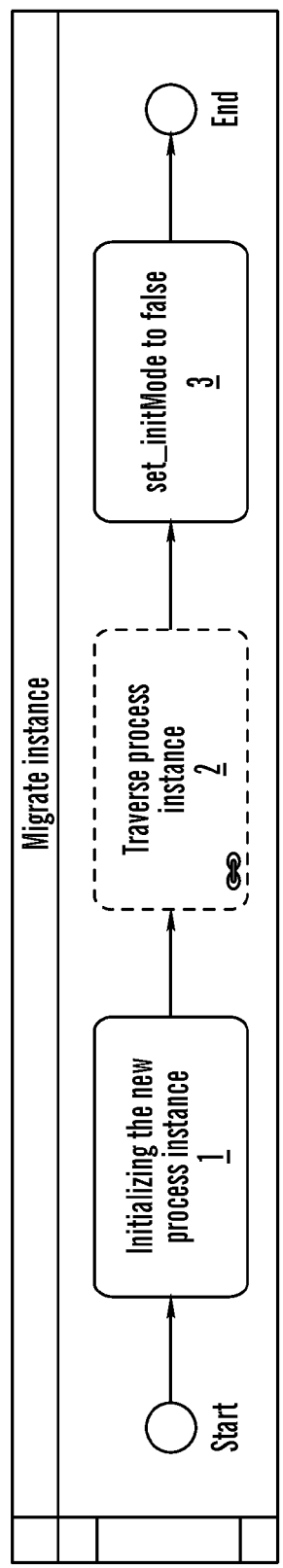

FIG. 2C illustrates a functional block diagram for performing the second phase of instance migration including, recursive traversal of each instance included in the instance data tree, including all instances started from the root process instance migration instance from source workflow environment 110 to target workflow environment 210.

Target workflow environment 210 initiates a new process instance in source BPEL engine 112. (Step 1). Target workflow environment 210 sets _initMode to true, in order to stop wait activities, in accordance with embodiments of the present invention. Target workflow environment 210 further sets the input variable to the start message from source process instance data, and initiates process instance from source workflow environment 110 to target workflow environment 210. According to an embodiment of the present invention, the migrated instance can further include traverse process instance of the process instance from source workflow environment 110 to target workflow environment 112. Target workflow environment 1210 further traverses process instance and sub-processes that were started by source workflow environment 110 to find the current execution pointer. (Step 2). Target workflow environment 210 further enables the normal execution of the process instance in target workflow system from the execution pointer in the source workflow system by negating wait activities. (Step 3).

Figure 2D:
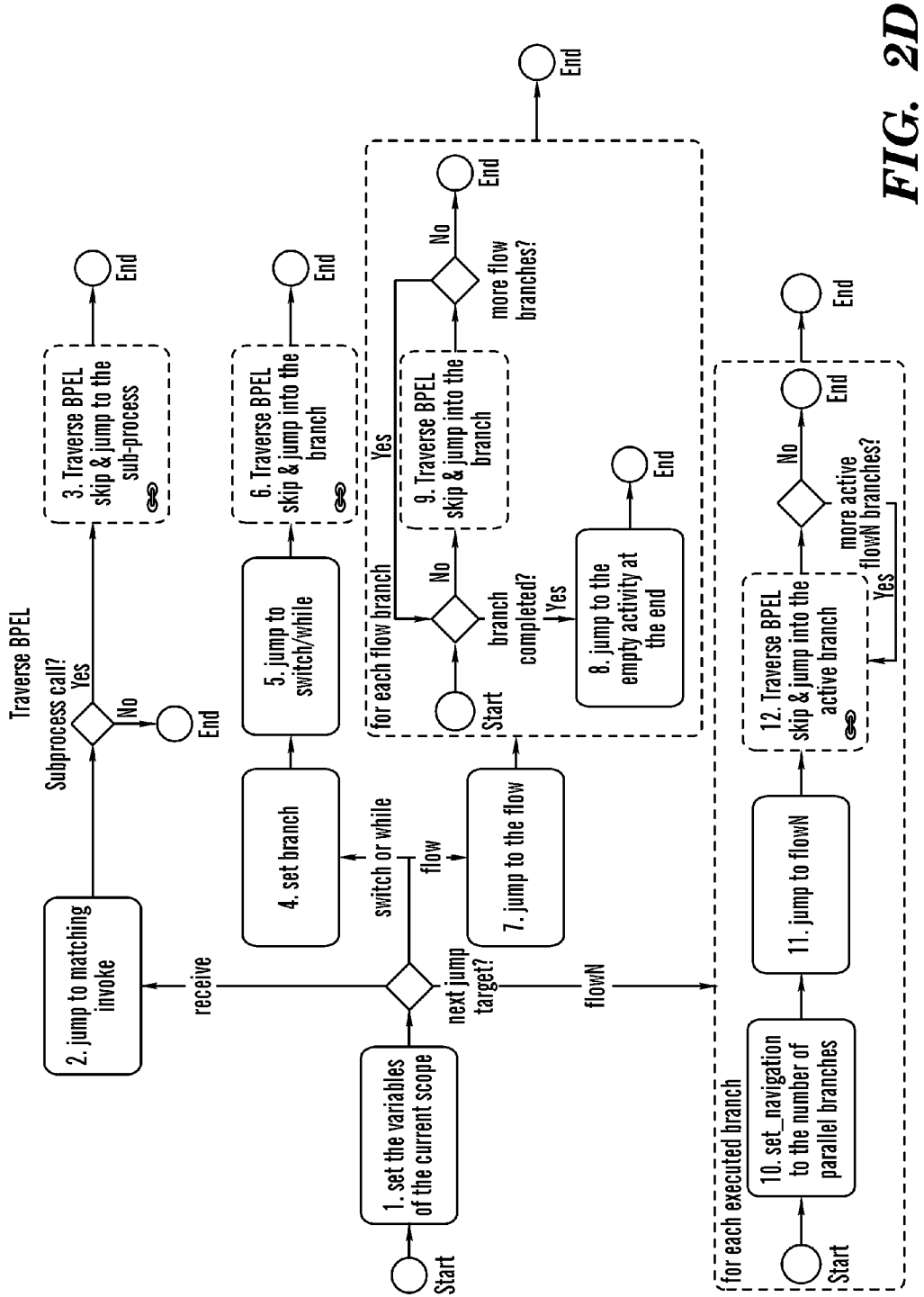

FIG. 2D illustrates a functional block diagram for performing traverse BPEL from source workflow environment 110 to target workflow environment 210, in accordance with embodiments of the present invention. Target workflow environment 210 sets variables of current scope of source workflow environment 110. (Step 1). For example, process instance is stopped in the wait activity variables of the current scope are set. At step 2, target workflow environment 210 performs jump to matching invoke. Also, a determination is made by target workflow environment 210 of whether a next jump target must be performed for an execution branch. Also, a determination is made of whether a subprocess call is made. At step 3, target workflow environment 210 traverses BPEL skip and jump to the subprocess of source workflow environment 110. At step 4 target workflow environment 210 sets branch. At step 5, target workflow environment 210 jumps to switch/while activity. At step 6, target workflow environment 210 traverses BPEL skip and jump into the branch of source workflow environment 110. At step 7, target workflow environment 210 jump to flow for each branch. For instance, a determination is made, whether, the branch is completed. If the branch is completed, then, at step 8, target workflow environment 210 jumps to an empty activity at the end of the activity sequence. However, if the branch is not completed, then at step 9, target workflow environment 210 traverses BPEL skip and jump into the branch. For example, for each executed branch, at step 10, target workflow environment 210 sets navigation to the number of parallel branches. Further, at step 11, target workflow environment jump to flown. Further, at step 12, traverse BPEL skip and jump into the active branch.

Figure 3:
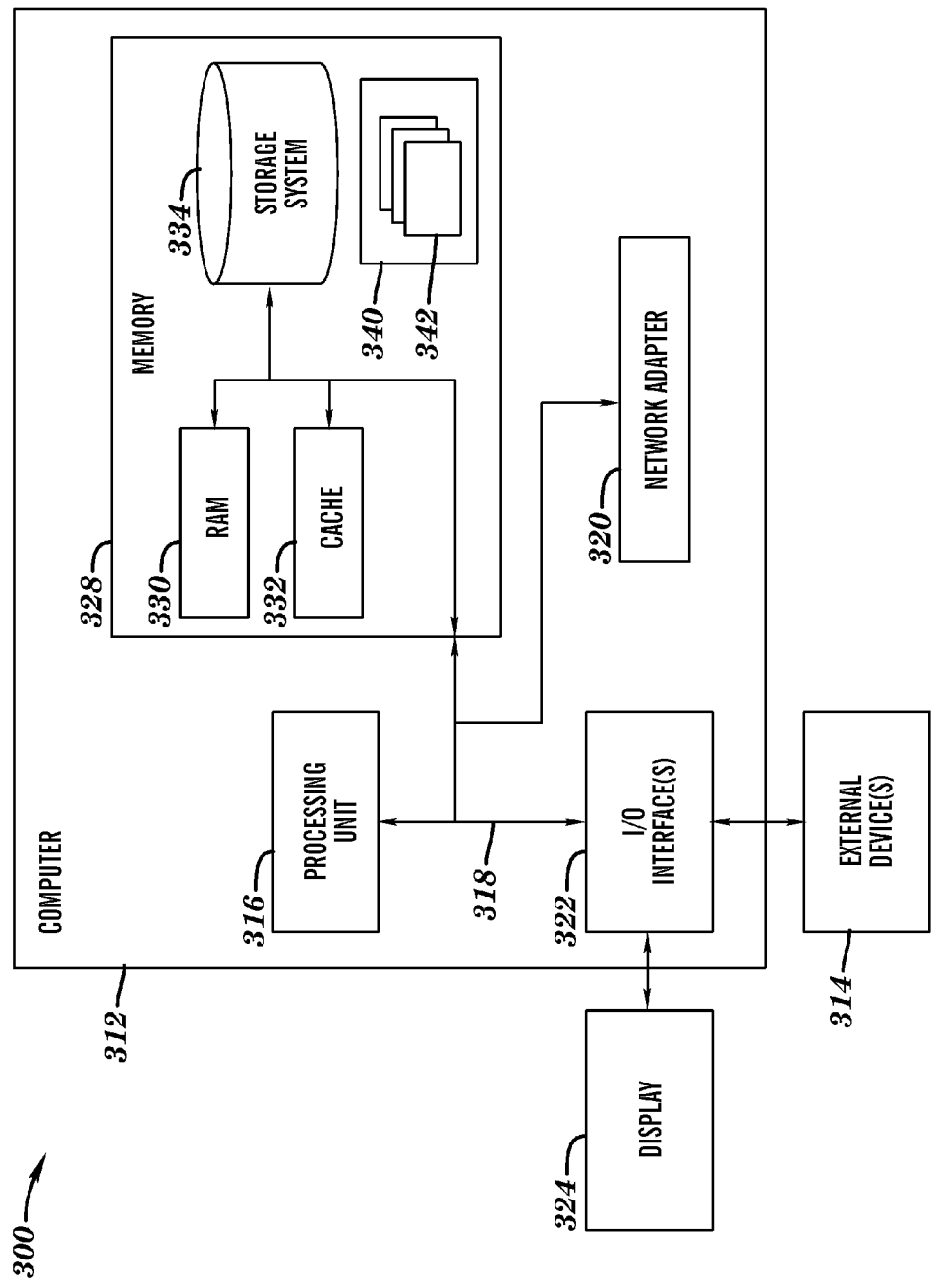
FIG. 3 is a block diagram of internal and external components of computers and servers depicted in FIG. 1 according to at least one embodiment.

FIG. 3 is a functional block diagram of a computer system 300, in accordance with an embodiment of the present invention.

The Computer system of FIG. 3 is only one example of a suitable computer system and is not intended to suggest any limitation as to the scope of use or functionality of embodiments of the invention described herein. Regardless, the computer system is capable of being implemented and/or performing any of the functionality set forth hereinabove. In the computer system of FIG. 1, there is computer 312, which is operational with numerous other general purpose or special purpose computing system environments or configurations. Examples of well-known computing systems, environments, and/or configurations that may be suitable for use with computer 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each one of administrator devices 110, 112, 114, mainframe server system 105 can be implemented as an instance of computer 312. Computer 312 may be described in the general context of computer system executable instructions, such as program modules, being executed by a computer system. Generally, program modules may include routines, programs, objects, components, logic, data structures, and so on that perform particular tasks or implement particular abstract data types. Computer 312 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 3, computer 312 is shown in the form of a general-purpose computing device. The components of computer 312 may include, but are not limited to, one or more processors or processing units 316, memory 328, and bus 318 that couples various system components including memory 328 to processing unit 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 312 typically includes a variety of computer system readable media. Such media may be any available media that is accessible by computer 312, and includes both volatile and non-volatile media, and removable and non-removable media.

Memory 328 includes computer system readable media in the form of volatile memory, such as random access memory (RAM) 330 and/or cache 332. Computer 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Source workflow environment 110 and target workflow environment 210 can be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein. Each one of source workflow environment 110 and target workflow environment 210 are implemented as or are an instance of program 340.

Computer 312 may also communicate with one or more external devices 314 such as a keyboard, a pointing device, etc., as well as display 324; one or more devices that enable a user to interact with computer 312; and/or any devices (e.g., network card, modem, etc.) that enable computer 312 to communicate with one or more other computing devices. Such communication occurs via Input/Output (I/O) interfaces 322. Still yet, computer 312 communicates with one or more networks such as a local area network (LAN), a general wide area network (WAN), and/or a public network (e.g., the Internet) via network adapter 320. As depicted, network adapter 320 communicates with the other components of computer 312 via bus 318. It should be understood that although not shown, other hardware and/or software components could be used in conjunction with computer 312. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains, or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for embodiments of the present invention may be written in any combination of one or more programming languages, including an object oriented programming language such as JAVA, SMALLTALK, C++ or the like, conventional procedural programming languages such as the "C" programming language, a hardware description language such as Verilog, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method, system and computer program product method for method process instance migration between a source workflow environment and a target workflow environment has been disclosed. However, numerous modifications and substitutions can be made without deviating from the scope of the present invention. In this regard, each block in the flowcharts or block diagrams may represent a module, segment, or portion of code, which includes one or more executable instructions for implementing the specified logical function(s). It should also be noted that, in some alternative implementations, the functions noted in the block may occur out of the order noted in the Figures. Therefore, the present invention has been disclosed by way of example and not limitation.

What is claimed is:

1. A computer-implemented method for performing process instance migration between a source workflow environment and a target workflow environment, the computer-implemented method comprising:
    a server computing system, exporting, via a source engine, by one or more processors, process models of a source workflow environment to a target workflow environment;
    the server computing system, migrating, via the source engine, by the one or more processors, process instances from the source workflow environment to the target workflow environment;
    if a jump function of the target workflow environment is restricted to an activity sequence, a target computing system of the target workflow environment, adjusting, via a target source engine, by one or more processors, the exported process models, wherein adjustment of the exported process models includes inclusion of wait activities of the target workflow environment, at beginning of a branch of activities;
    the target computing system, initializing, via the target source engine, by the one or more processors, another process instance, from the exported process models in the target workflow environment;
    the target computing system, setting, via the target source engine, by the one or more processors, instance variables of the target workflow environment, wherein the instance variables are set from source instance data of the source workflow environment; and
    the target computing system, applying, via the target source engine, by the one or more processors, jumps to an end sequence of branch of activities, until a position of the exported process model is reached in the source workflow environment.

2. The computer-implemented method according to claim 1, wherein the branch of activities includes at least one of a scope, switch, or parallel activity of the target workflow environment.

3. The computer-implemented method according to claim 1, wherein, if the jump function allows arbitrary positioning of the exported process model, the computer-implemented further includes: initializing, by the one or more processors, yet another process instance from the exported process models in the target workflow environment.

4. The computer-implemented method according to claim 1 further includes:
    initializing, via the target source engine, by the one or more processors, process instance in the target workflow environment, wherein the process instance includes same process state and same process data of the source workflow environment.

5. The computer-implemented method according to claim 1, wherein the source workflow environment is a source business process management environment, of a service-oriented architecture suite for building, deploying, and managing service oriented architectures with the source business process management environment.

6. The computer-implemented method according to claim 1, wherein the target workflow environment provides run time processing for process design, execution, monitoring and optimization of a business workflow environment, and wherein, the run time processing provides system integration support between the source workflow environment and the target workflow environment.

7. The computer-implemented method according to claim 1 further includes:
    compiling, via the source engine, by the one or more processors, data of the migrated process instance in the source workflow environment;
    transmitting, via the source engine, by the one or more processors, the compiled data of the migrated process instance, from the source workflow environment to the target workflow environment; and setting, via the target source engine, by the one or more processors, an equivalent process state of data of the migrated process instance of the source workflow environment in the target workflow environment.

8. A computer system for performing process instance migration between a source workflow environment and a target workflow environment, the computer system comprising:
    one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
    program instructions to export via a source engine, process models of a source workflow environment to a target workflow environment;
    program instructions to migrating, via the source engine, process instances from the source workflow environment to the target workflow environment;
    program instructions to adjust, via a target source engine, by one or more processors, the exported process models, wherein adjustment of the exported process models includes inclusion of wait activities of the target workflow environment, at beginning of a branch of activities, if a jump function of the target workflow environment is restricted to an activity sequence, a target computing system of the target workflow environment;
    program instructions to initialize, via the target source engine, another process instance, from the exported process models in the target workflow environment;
    program instructions to set via the target source engine, instance variables of the target workflow environment, wherein the instance variables are set from source instance data of the source workflow environment; and
    program instructions to apply via the target source engine, jumps to an end sequence of the branch of activities, until a position of the exported process models is reached in the source workflow environment.

9. The computer system according to claim 8, wherein the branch of activities includes at least one of a scope, switch, or parallel activity of the target workflow environment.

10. The computer system according to claim 8, wherein, if the jump function allows arbitrary positioning of the exported process models, the computer-implemented further includes: initializing, by the one or more processors, yet another process instance from the exported process models in the target workflow environment.

11. The computer system according to claim 8 further comprising:
program instructions to initialize, via the target source engine, process instance in the target workflow environment, wherein the process instance includes same process state and same process data of the source workflow environment.

12. The computer system according to claim 8, wherein the source workflow environment is a source business process management environment, of a service-oriented architecture suite for building, deploying, and managing service oriented architectures with the source business process management environment.

13. The computer system according to claim 8, wherein the target workflow environment provides run time processing for process design, execution, monitoring and optimization of a business workflow environment, and wherein, the run time processing provides system integration support between the source workflow environment and the target workflow environment.

14. The computer system according to claim 8 further comprising:
program instructions to compile, via the source engine, data of the migrated process instance in the source workflow environment;
program instruction to transmit, via the source engine, the compiled data of the migrated process instance, from the source workflow environment to the target workflow environment; and
program instructions to set, via the target engine, an equivalent process state of data of the migrated process instance of the source workflow environment in the target workflow environment.

15. A computer program product for performing process instance migration between a source workflow environment and a target workflow environment, the computer program product comprising:
one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
program instructions to export, via a source engine, process models of a source workflow environment to a target workflow environment;
program instructions to migrating, via the source engine, process instances from the source workflow environment to the target workflow environment;
program instructions to adjust, via a target source engine, by one or more processors, the exported process models, wherein adjustment of the exported process models includes inclusion of wait activities of the target workflow environment, at beginning of a branch of activities, if a jump function of the target workflow environment is restricted to an activity sequence, a target computing system of the target workflow environment;
program instructions to initialize, via the target source engine, another process instance, from the exported process models in the target workflow environment;
program instructions to set via the target source engine, instance variables of the target workflow environment, wherein the instance variables are set from source instance data of the source workflow environment; and
program instructions to apply via the target source engine, jumps to an end sequence of the branch of activities, until a position of the exported process model is reached in the source workflow environment.

16. The computer program product according to claim 15, wherein the branch of activities includes at least one of a scope, switch, or parallel activity of the target workflow environment.

17. The computer program product according to claim 15, wherein, if the jump function allows arbitrary positioning of the exported process model, the computer-implemented further includes: initializing, by the one or more processors, yet another process instance from the exported process models in the target workflow environment.

18. The computer program product according to claim 15 further comprising:
program instructions to initialize, via the target engine, process instance in the target workflow environment, wherein the process instance includes same process state and same process data of the source workflow environment.

19. The computer system according to claim 15, wherein the source workflow environment is a source business process management environment, of a service-oriented architecture suite for building, deploying, and managing service oriented architectures with the business process management environment.

20. The computer system according to claim 15 further comprising:
program instructions to compile, via the source engine, data of the migrated process instance in the source workflow environment;
program instruction to transmit, via the source engine, the compiled data of the migrated process instance, from the source workflow environment to the target workflow environment; and program instructions to set, via the target source engine, an equivalent process state of data of the migrated process instance of the source workflow environment in the target workflow environment.

* * * * *